Aug. 23, 1966  BUNZO HIRANO  3,268,046
AUTOMATIC CLUTCH

Filed Sept. 9, 1963  3 Sheets-Sheet 2

INVENTOR.
BUNZO HIRANO
ATTORNEY

Aug. 23, 1966  BUNZO HIRANO  3,268,046
AUTOMATIC CLUTCH
Filed Sept. 9, 1963  3 Sheets-Sheet 3

INVENTOR.
BUNZO HIRANO
BY
ATTORNEY

United States Patent Office 3,268,046
Patented August 23, 1966

3,268,046
AUTOMATIC CLUTCH
Bunzo Hirano, 539 Nishinoshima, Toyotamura,
Iwata-gun, Shizuoka, Japan
Filed Sept. 9, 1963, Ser. No. 307,681
Claims priority, application Japan, Dec. 3, 1960,
35/47,699
1 Claim. (Cl. 192—103)

This is a continuation-in-part of application Serial No. 150,077, filed November 3, 1961, now Patent No. 3,240,305.

Typical of automatic clutches, specifically for automobiles, is a centrifugal friction clutch which depends on the speed of the engine. As the output of the engine is substantially proportional to the speed, a torque proportional to the output will be transmitted. Therefore, such centrifugal friction clutch seems to be reasonable. However, as the clutch is engaged at the same constant output or speed of the engine even in starting the car under a large load or on an upgrade as in starting it on a flat road, the output will be so low as to stall the engine. As the clutch is engaged at the time of a constant output even in a quick start requiring a high output, the engine will be accelerated after the engagement of the clutch and therefore naturally the output will be low. Said centrifugal friction clutch can not be said to be perfectly adapted to such use in that the acceleration and load always fluctuate.

An object of the present invention is to provide an automatic clutch wherein the load resistance and acceleration resistance on a driven shaft are detected independently of the speed of the engine and are made to act to properly reduce the amount of the torque transmitted by the clutch with increasing speed of the engine so that, after the engine is accelerated so much that the output will not be restricted by the resistance of the driven shaft, the car may be always started quickly or upgrade with the high output under the conditions best adapted to the situation.

The present invention shall be described with reference to the drawings in which.

Figure 1:
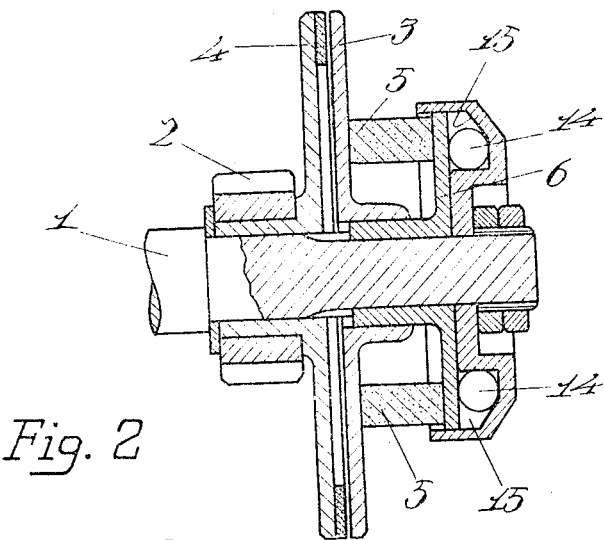
FIGURE 1 is a vertically sectioned side view of a clutch of the present invention utilizing the relation between the shearing stress and compressive stress of elastic bodies.

In FIGURE 1, 1 is a driving shaft, 2 is a driven gear and 3 and 4 are driving and driven friction plates, respectively. One of them, for example, the driving friction plate 3 is movable in the axial direction and is combined with a driving disk carried by and axially slidable on a driving shaft and connected with elastic bodies 5 such as rubber rods of a proper length. The driven friction plate 4 is fixed to the driven gear 2.

14 is a centrifugal ball. With the rotation of the driving shaft 1, said centrifugal balls 14 will be rotated and will apply their axial components to the driving friction plate 3 through the elastic bodies 5 due to the inclined surface 15.

A torque corresponding to the pressing force will be transmitted between both friction plates 3 and 4. Therefore, the rotation of the driving disk 6 will rotate the driving friction plate 3 through the elastic bodies 5 and will be transmitted to the driven friction plate 4. Now, if there is a resistance on the driven gear side, a shearing stress corresponding to the resistance will be naturally produced in the elastic bodies. In such case, the shearing stress will act to reduce the compressive stress and therefore the pressing force on the friction clutch faces will reduce and the transmitted torque will decrease. In response to the magnitude of the resistance applied to the friction shaft, the degree of reduction of the amount of the torque transmitted by the clutch will fluctuate. The ratio of the reduction of the transmitted amount of the torque to the magnitude of the resistance can be freely designed by the shape and size of the elastic bodies 5. Needless to say, even in a form in which the driving shaft and driven shaft are interchanged with each other, the action will be the same.

Figure 5:
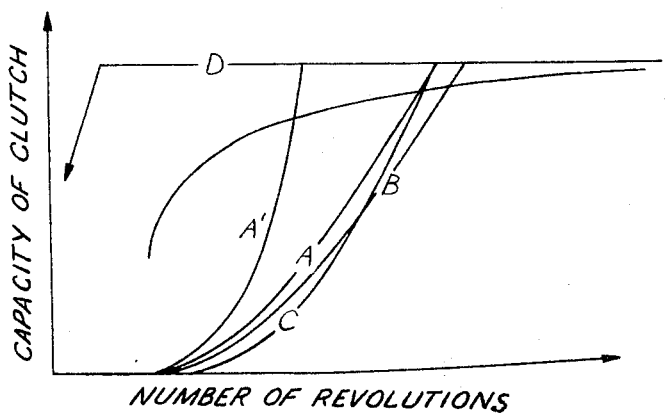
FIGURE 5 is a diagram for explaining the operation.

As the clutch is such, it will act the same as a centrifugal force clutch which depends on the speed of the engine. However, the compressive stress of the elastic bodies will gradually increase, at the same time the shearing stress will also tend to increase under the constant load on the driven side and the increase of the pressing force with their balance will be a little different from the increase of the torque transmitted by the centrifugal clutch. That is to say, it is shown by the curve A representing the relation of the capacity of the clutch with the number of revolutions of the driving shaft in the diagram in FIGURE 5. (The curve A' is of an ordinary centrifugal clutch.) It shows the operating characteristics of the clutch of the present invention.

On the basis of this characteristic curve A, the clutch will act. It is the load resistance and acceleration resistance that vary the action of the clutch. The load resistance will fluctuate with the carried load and the gradient of the runway. When the load resistance is high, the characteristics curve will be slow, that is to say, the number of revolutions will shift to be such at which the increase of the capacity of the clutch will be a little higher than at a low load. The degree of the shift will be determined entirely by the magnitude of the load resistance. (See the curve B in FIGURE 5.) The car can be accelerated where the engine output is that much higher. The acceleration resistance will fluctuate with the time of applying the centrifugal force or the pressing force. This relates to the feed of gasoline and is a problem of the intention of the driver. When the throttle grip is rotated quickly, the acceleration resistance on the driven side will be so high that the speed of the driving shaft in engaging the clutch will be as high as in the case of the above mentioned load resistance and therefore the car will start quickly. (This is shown by the curve C in FIGURE 5.) The speed of the driving shaft for the same clutch capacity should be considerably higher as compared with the curve A. Even when the car is running at a fixed speed with the clutch fully engaged, if the engine is accelerated quickly, in the conventional clutch, the acceleration will be with all the load on the driven side but, in the present clutch, the reduction of the clutch capacity with the action of the above mentioned basic clutch by the acceleration resistance will be seen, therefor the engine will accelerate the car under the high output after the quick acceleration with the low load and the accelerating effect will be high. At the time of reducing the speed, the clutch will remain substantially fully engaged until the speed becomes considerably lower than in engaging the clutch and therefore it will be possible to use the engine brake as different from the case of the conventional centrifugal clutch. (See the curve D in FIGURE 5.)

Figure 2:
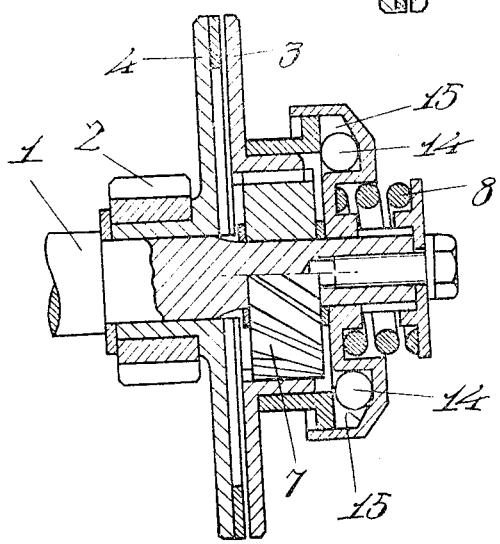
FIGURE 2 is a vertically sectioned side view of a clutch of the present invention utilizing an inclined surface.

In FIGURE 2, the relation between the compressive stress and shearing stress of the above mentioned elastic bodies is replaced with inclined surfaces in the axial direction and rotating direction. (The drawing shows a screw pair.)

The driving friction plate 3 is carried by the driving shaft 1 and screw pair 7 so as to be pressed against the driven friction plate 4 by the centrifugal force of the centrifugal balls 14. A spring 8 is fitted on the back of the inclined surface 15 so as to make the action soft. The screw pair 7 is such as will give the axial displacement of the driving friction plate 3 in the direction separating it from the driven friction plate 4. If the driving direction is clockwise as seen from the right in the drawing, the screw of the pair will be clockwise. The pressing force due to the centrifugal force will produce respective components in the axial direction and rotating direction due to said screw pair 7. The component in the axial direction will become an effective pressing force for the friction plate. The component in the rotating direction will become a coupling force making it possible to transmit the same torque from the driving shaft to the driving friction plate.

On the contrary, the resistance (which is a force in the rotating direction) from the driven side will appear in the axial direction due to the inclined surface 7 or against the pressing force due to the centrifugal force and therefore the substantial clutch pressing force will be reduced that much. The operation is exactly the same as in the clutch in FIGURE 1. The ratio of the transmitted amount of the torque to the magnitude of the resistance will be determined by the degree of the inclination and the size of the effective radius in the position of setting the inclined surface. Needless to say, it is possible to interchange the driven side and the driving side with each other.

Figure 3:
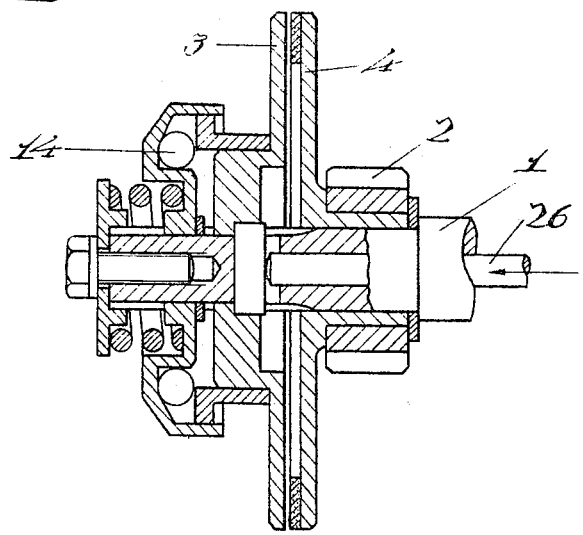
FIGURE 3 is a vertically sectioned side view of a clutch of the present invention.

FIGURE 3 discloses a form of the invention in which a rod 26 is used to urge the friction surfaces in a direction to reduce the force applied to the surfaces or to separate the surfaces if desired.

Figure 4:
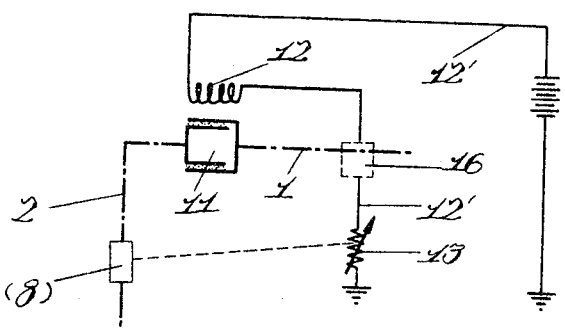
FIGURE 4 is an electric wiring diagram of an electromagnetic clutch made by electrically converting the clutch of the present invention.

FIGURE 4 shows the application to an electromagnetic clutch. 11 is an electromagnetic clutch. In such electromagnetic clutch, friction plates or a magnetic fluid is used, a magnetic field is generated by feeding an exciting current to an exciting coil 12, a torque is transmitted by converting the attraction of the magnetic field into a pressing force for the friction plates or by reducing the fluidity of the magnetic fluid and the transmitted amount of the torque will be substantially proportional to the intensity of the exciting current. 13 is a variable resistance inserted in the exciting current circuit. When the variable resistance 13 is so provided that its resistance value may increase with the change of load, the amount of the torque transmitted by said electromagnetic clutch 11 will change in response to the magnitude of the resistance on the driven side.

With an exciting current controlling device 16, the exciting current will be increased in response to the speed of the driving shaft.

As described above, the present clutch will be most effective when utilized specifically in cases where the output varies in response to the speed of the engine such as of an automobile where the acceleration and deceleration are always occurring and the condition of the load always varies. There will be made such gradual start (represented by the curve A in FIGURE 5) mostly by the utilization of the centrifugal force wherein, in starting on an ordinary flat road, the clutch will be engaged at any required speed of the engine and, with the increase of the speed, the torque capacity will be gradually increased. Thus, the relation of the increase of the speed of the engine in which the clutch capacity will increase in starting under a large load or on an upgrade will take place at a little higher speed (higher output) of the engine in response to the condition of the load. Therefore, the engine will not stall. In quickly starting the car, if the engine is quickly accelerated, the clutch will be engaged at a speed higher than in ordinary starting and will then so operate that the clutch capacity may quickly increase. Therefore, the car will be accelerated as intended by the driver. In accelerating the car during the operation at a fixed speed, the clutch capacity will first reduce and the engine will be quickly accelerated under a low load and then will be connected gradually. Therefore, the acceleration capacity is high. Under the full load, the acceleration of the engine will hardly be as intended. However, in the present clutch, the driven shaft will be accelerated under the high output under which the engine has been accelerated. In shifting the transmission gears, even if the once released clutch is quickly connected, it will be naturally gradually engaged. (See the characteristics in FIGURE 5.) Therefore, the operative connection to the transmission gear is easy.

It can be simply provided that, when the torque is reversely transmitted from the driven side to the driving side, the friction plates will be pressed together a corresponding amount. Therefore, even at a number of revolutions at which the centrifugal force is of a capacity at or below semiclutching, the clutch will be fully engaged. Therefore, it is easy to make engine braking, kick-starting or push-starting (in motorcycles). As soon as the brake pedal is pressed, the clutch will be disengaged. When the engine brake is unnecessary, that is to say, when the engine side is transmitting a torque to the rear wheels, as soon as the speed of the engine reduces, the clutch will be again fully engaged and the engine brake will be applied. Thus, the operation is quite flexible. The present invention is therefore an automatic clutch which performs all actions no less ideally than any manual operation.

What I claim is:

A clutch comprising a driving member, a driven member, and means mounting said members for driving engagement and disengagement, said means comprising means responsive to speed for engaging said members with a predetermined force and means responsive to a given predetermined torque to reduce the force of engagement of the members, wherein the torque responsive means comprises threaded members and spring means urging the threaded members into engagement, said threaded members urging the driving and driven members out of engagement upon an increase of the torque in the driving direction above said predetermined torque.

References Cited by the Examiner

UNITED STATES PATENTS

| | | |
|---|---|---|
| 1,044,894 | 11/1912 | Leonard. |
| 1,118,132 | 11/1914 | Jones. |
| 2,079,678 | 5/1937 | Chilton. |
| 2,154,591 | 4/1939 | Waseige. |
| 2,721,639 | 10/1955 | Miller _____ 192—54 |
| 3,058,556 | 10/1962 | Marland _____ 192—45 |

DAVID J. WILLIAMOWSKY, *Primary Examiner.*

DON A. WAITE, *Examiner.*

A. T. McKEON, *Assistant Examiner.*